Sept. 3, 1946.  E. F. WOODWARD  2,407,201
INTERCHANGEABLE TOOL HOLDER
Filed May 22, 1944
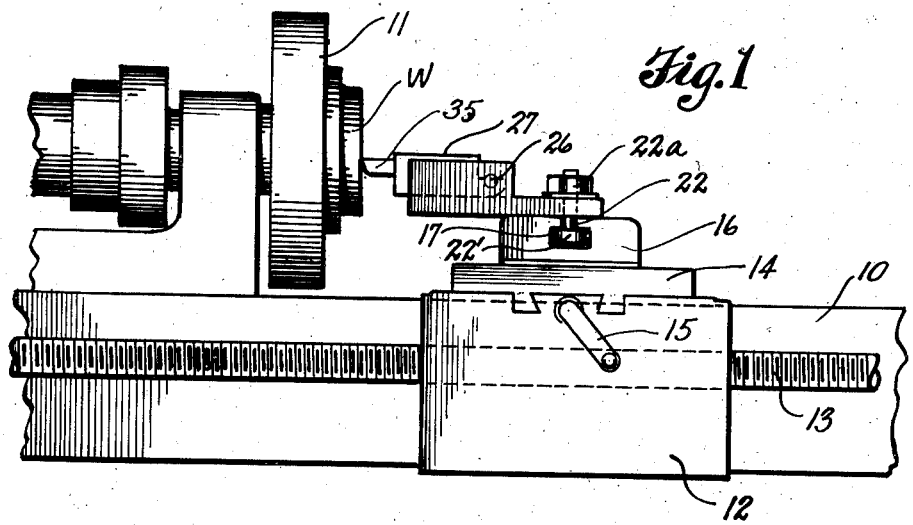
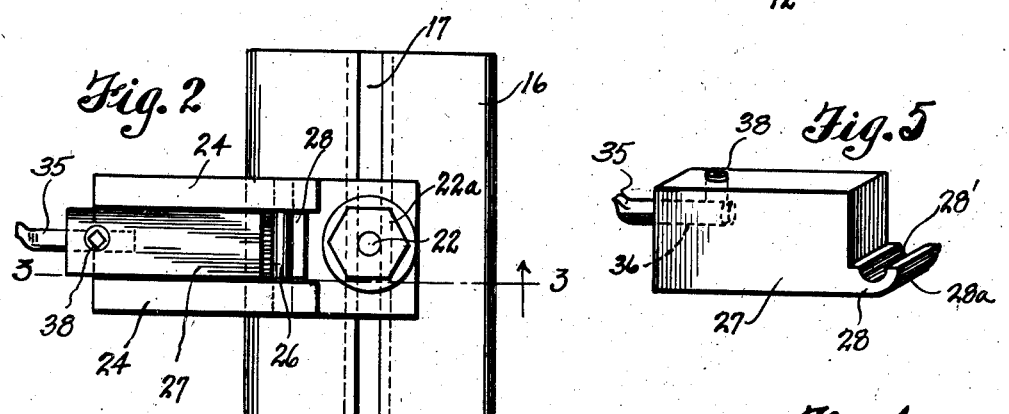
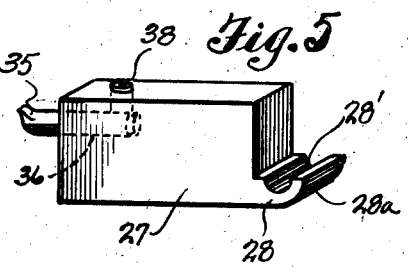
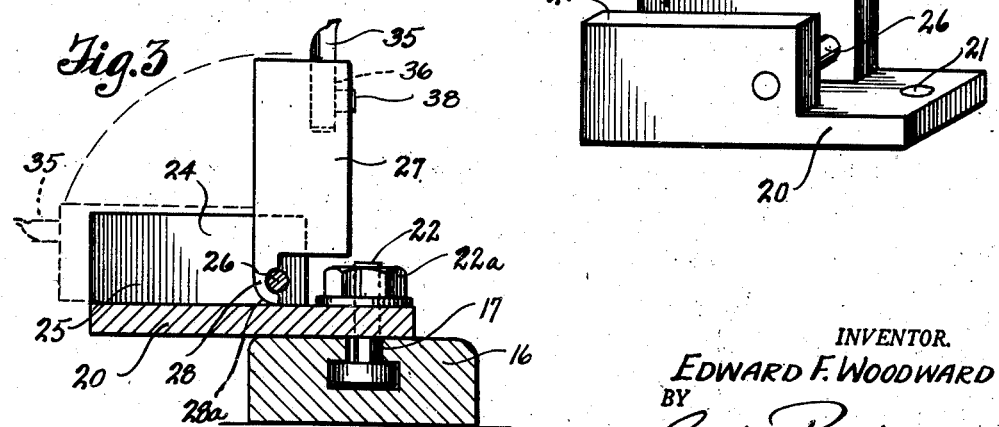
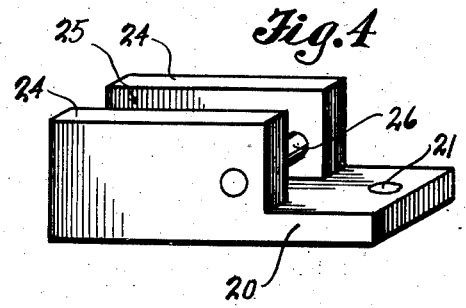
INVENTOR.
EDWARD F. WOODWARD
BY
Cook & Robinson
ATTORNEYS Patented Sept. 3, 1946

2,407,201

UNITED STATES PATENT OFFICE 2,407,201

INTERCHANGEABLE TOOLHOLDER

Edward F. Woodward, Seattle, Wash.

Application May 22, 1944, Serial No. 536,683

1 Claim. (Cl. 82—35)

This invention relates to tool holders adapted for use in turning lathes, and it has reference more particularly to an improved form of interchangeable tool holder; it being the principal object of this invention to provide a practical, safe and economical tool holder which makes possible the easy and quick removal and application of the various tools as may be required in the lathe operations on any particular piece of work or as used on various pieces of work.

More specifically stated, the present invention has to do with the provision of an interchangeable tool holder for lathes, comprising a base portion which may be fixed in various positions of adjustment on the compound slide or rest of the lathe, and which base portion is formed with an upwardly opening channel in which tools of various kinds may be interchangeably applied and functionally secured by an interlocking of parts of the tool block and the base member.

Various objects of the invention reside in the details of construction of the various parts of the device, in their relationship, mode of assembly, mode of release and use, as will hereinafter be fully described.

In accomplishing the above mentioned and other objects of the invention, I have provided the improved details of construction, the preferred forms of which are illustrated in the accompanying drawing, wherein—

Fig. 1 is a side view of a portion of an engine lathe to which the present tool holder has been applied in accordance with the present invention.

Fig. 2 is a plan view of an interchangeable tool holder embodying this invention, and the compound slide or rest upon which it is mounted.

Fig. 3 is a sectional view taken on the line 3—3 in Fig. 2, illustrating the manner of applying a tool to the base member.

Fig. 4 is a perspective view of the base member of the present tool holder.

Fig. 5 is a perspective view of the tool, or tool mounting block.

Referring more in detail to the drawing—

First, referring to Fig. 1, which shows a portion of a typical form of engine lathe to which the present tool holder is applied: 10 designates a portion of the lathe bed; 11 is the face plate upon which a work piece W is fixed; 12 is the carriage that is adjustable along the bed of the lathe by means of the usual lead screw 13, and 14 is the cross slide that is mounted on the carriage and is adjustable in a direction transverse of the bed by means of the hand crank designated at 15.

Mounted on the cross slide 14 is the part referred to as the compound slide, or rest, 16 which may be of the type that can be swiveled in a horizontal plane and secured at a set position of adjustment. This compound slide is equipped in its top side with a longitudinal upwardly opening keyway 17 of that type in which the head of a bolt or the like may be held secure while the shank of the bolt extends upwardly from the keyway.

It is to be understood that the above described parts are merely typical of those parts of an engine lathe with which the present tool holder may be applied, and the description given is not intended in any way to be limiting on the invention, but merely is in the nature of an explanation that will make for a better understanding of the invention itself, which will now be described.

The present tool holder comprises two main parts, one being the base portion which is shown by itself in Fig. 4, and the tool or tool block which is shown by itself in Fig. 5. The base portion comprises a flat, horizontally disposed bar 20 having a vertical hole 21 through its outer end portion designed to receive a holding or clamping bolt.

In Fig. 3, in particular, it is shown that the bar 20 is disposed flatly upon the top surface of the slide 16 and that the shank of an anchor bolt 22 is extended upwardly through the hole 21 and that the bolt head 22 is held in the keyway 17 and that a nut 22a is threaded onto the shank and tightened against the base member to secure it rigidly in a set position of adjustment on the slide 16.

On the inner end portion of the bar 20 are two upstanding, spaced apart rails 24—24 which define an intermediate upwardly opening channel 25. The side walls of this channel are vertical and parallel, and the base surface of the channel is flat and is a continuation of the top surface of that end portion of the bar through which the hole 21 is formed.

Extending through the rails 24—24 and transversely across the channel at a slight distance above the bottom surface thereof, is a tool retaining pin 26, and as noted in Fig. 3, this pin is located near what has been referred to as the inner end of the channel; that being the end that is nearest that end of the bar in which the hole 21 is formed. This designation is only for purpose of explanation.

The tool block or tool as seen best in Fig. 5, comprises a single bar of metal 27, rectangular in cross section and of such predetermined width that it will fit closely within, and without binding, in the channel 25. The bar 27 is approximately of the same length as the channel and of slightly greater depth, and it has a flat under surface adapted to engage flatly against the bottom surface of the channel. At its inner end, the bar 25 has a flange or projection 28 continuing from its lower edge portion, and this flange is formed in its top side, as seen best in Fig. 5, with a semicylindrical, transverse groove or seat 28', and the flat under surface of the block at this end merges into an upwardly rounded surface 28a that is curved about the axial line of the seat 28 as a center line. The vertical thickness of the flange 28 is equal to the vertical distance between the axis of the pin 26 and the bottom surface of the channel 25, and the seat 28', is so formed as to fit exactly to the cross pin 26. The curvature of the under surface of the extended flange 28 is such that by holding the tool block 27 in an upright position, as it has been shown in full lines in Fig. 3, with the seat 28' engaged against the side of the pin 26, as a pivot member, the tool may be swung downwardly to a horizontal position as indicated by the direction of the arrow and the dotted line showing of the tool block in Fig. 3, thus to cause the flange 28 to be hooked beneath the pin in a manner to lock the tool against endwise movement. The tool will then be held securely between the flanges 24—24 of the base member and will be secured for application of the tool end to the work carried on the face plate.

In the outer end of the tool holder block is the cutter tool 35. Such cutters may have various shapes, depending upon the character of work which it is desired to perform, and it is preferably mounted by being seated in a bore 36 formed in the end of the block, and held by a set screw 38 threaded into the top of the block and tightened against the tool shank.

It is the intention that tools be provided for the various operations that are to be done on any particular piece of work. Then during the operations on a piece of work, these tools are interchangeably used as may be required.

To release any tool from the holder, for replacement by another, it is necessary only that it be disengaged from the work piece, and that the free end of the tool holder block be swung upwardly from the dotted line position to the full line position shown in Fig. 3. This disengages the flange 26 from the locking pin 24 and the tool block may be lifted from the holder. Another tool holder block may then be inserted.

Interchangeable tool holders of this kind are very desirable and are practical to use due to the fact that only a matter of a few seconds is consumed in changing from one work tool to another. It is not required that any pins or bolts be removed or that any bolts, nuts or pins be tightened to hold the tool holder in place. The downward direction of application of force against the cutter 35 keeps the tool in place.

Such devices may be made in various sizes to adapt them to any particular kind of work or any particular type of lathe, and it is not essential that they be used with any special make or type of lathe or that they be applied directly to the compound slide or other cross slide.

Having thus described my invention, what I claim as new therein and desire to secure by Letters Patent is:

A tool holding means of the character described comprising a base block adapted for fixed securement to a cross slide or the like, and having a longitudinal, upwardly opening channel therein formed with a flat bottom surface, an anchor pin mounted in the block and extended transversely through the channel near the inner end thereof, and a tool holding bar fitted in the channel, between its side walls, and having means at its outer end for mounting a tool and having an extension at its inner end for engaging beneath the anchor pin; said extension having a cross channel seating the pin therein when the bar is in place and said extension of the bar having its bottom surface curved about the axial line of the anchor pin and providing release of the bar from the pin by upward swinging movement of its outer end.

E. F. WOODWARD.